Oct. 8, 1929.  L. G. MERRITT  1,730,859
POWER TRANSMISSION UNIT
Original Filed April 25, 1922    5 Sheets-Sheet 4

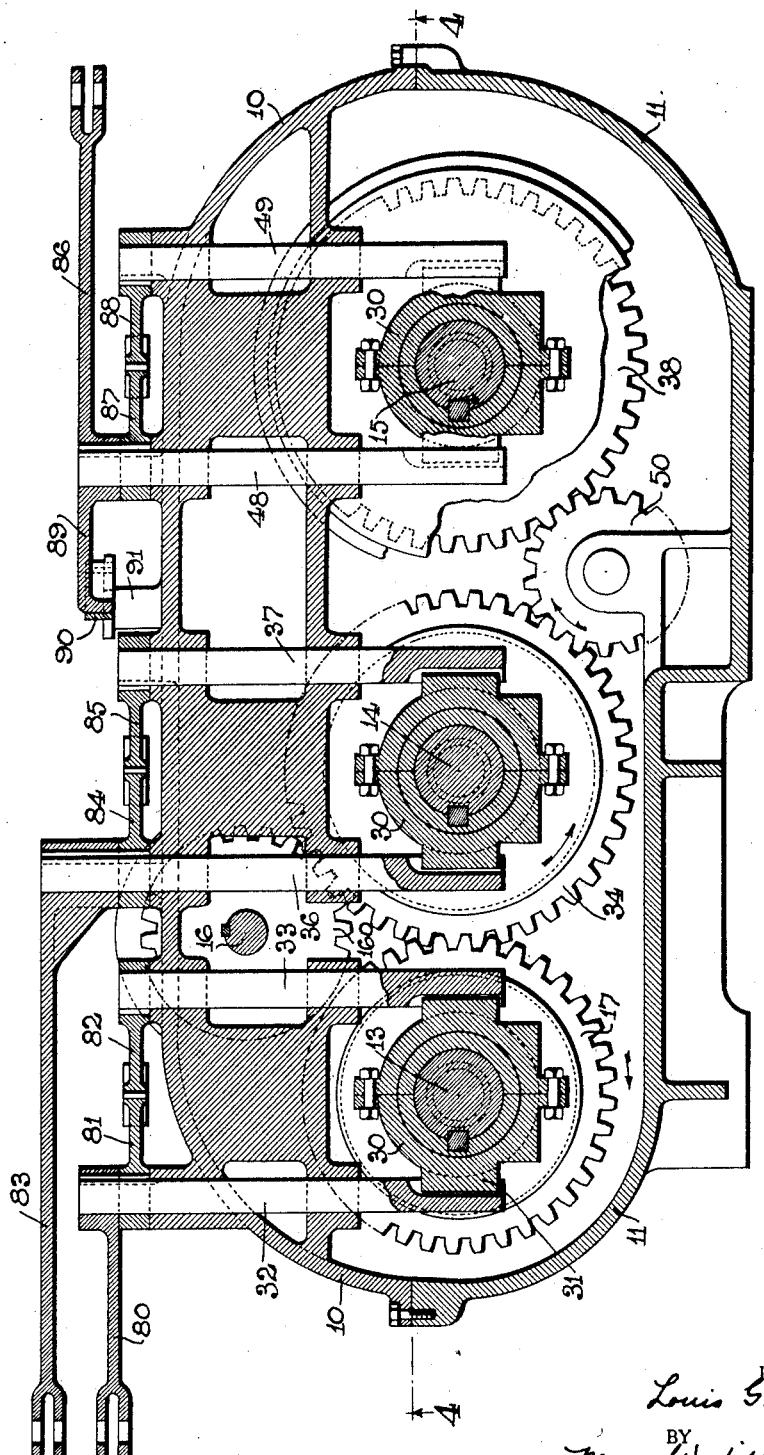

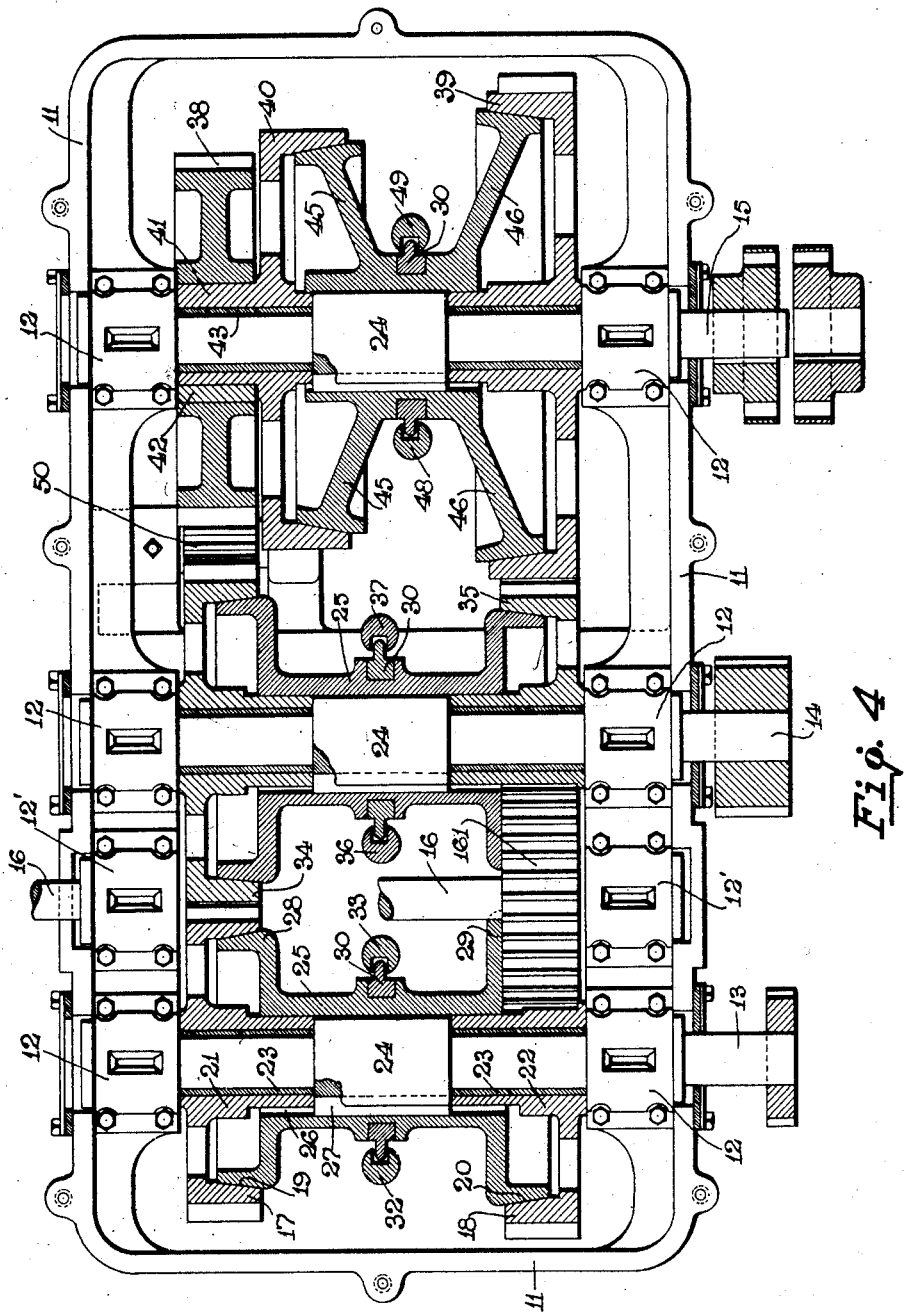

INVENTOR
Louis G. Merritt
BY
Mayer, Warfield and Watso
ATTORNEY

Oct. 8, 1929.   L. G. MERRITT   1,730,859
POWER TRANSMISSION UNIT
Original Filed April 25, 1922   5 Sheets-Sheet 5
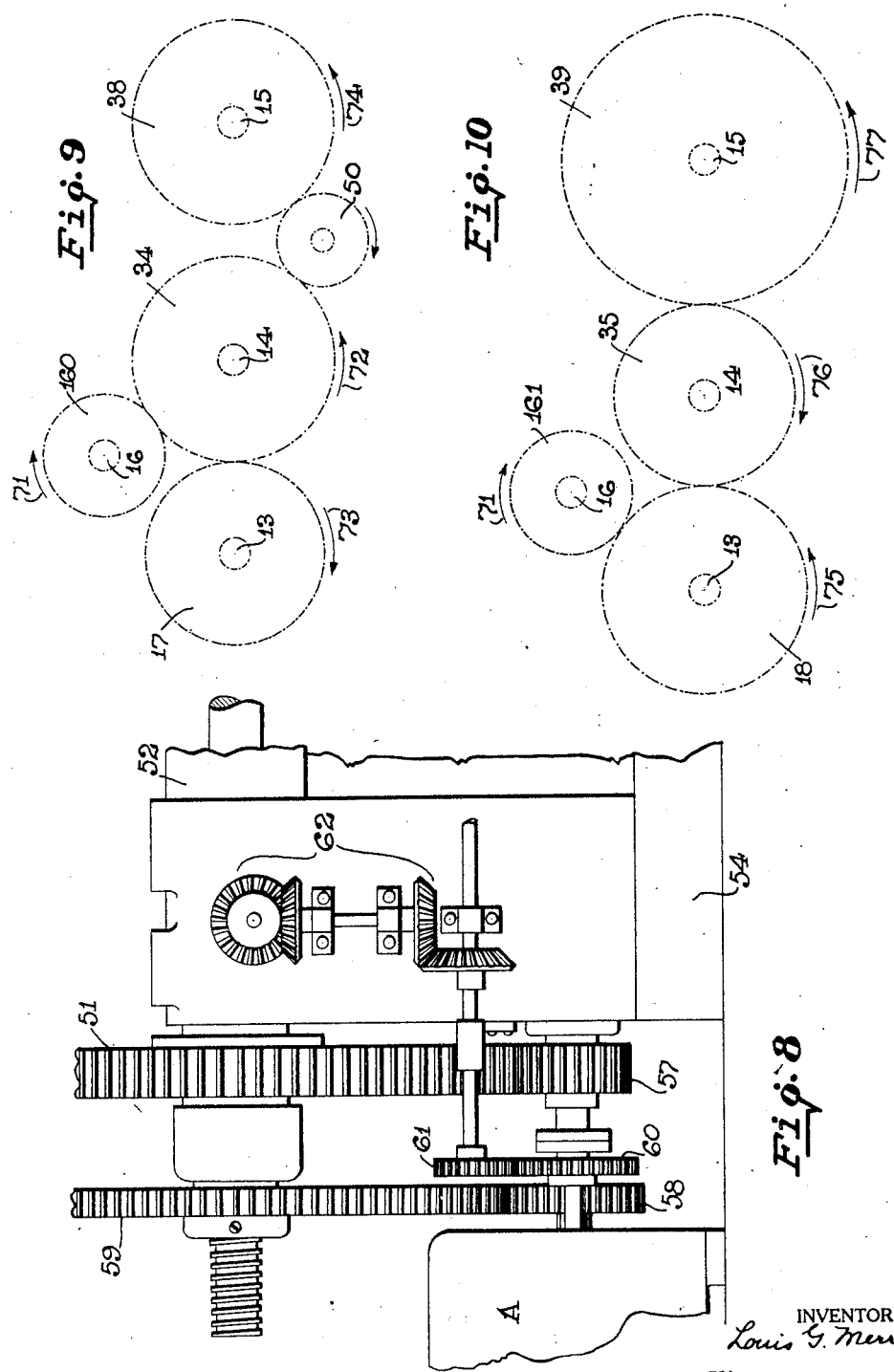
INVENTOR
Louis G. Merritt
BY
Mayer, Warfield and Watson
ATTORNEY Patented Oct. 8, 1929

1,730,859

UNITED STATES PATENT OFFICE

LOUIS G. MERRITT, OF LOCKPORT, NEW YORK, ASSIGNOR TO MERRITT MANUFACTURING CO., OF LOCKPORT, NEW YORK, A CORPORATION OF NEW YORK

POWER-TRANSMISSION UNIT

Original application filed April 25, 1922, Serial No. 556,511. Divided and this application filed October 17, 1924. Serial No. 744,122.

This invention relates to power transmission units, and more particularly, to encased mechanisms adapted to be applied as units for speed-changing and reversing operations on power-driven machines.

The object of the invention is generally to improve the construction and arrangement of parts in power transmission units so that an efficient, economical, and readily manufactured device results.

More specifically an object of the invention is to provide a gear-box in the form of a power transmission unit, which is rugged and compact and has convenient mechanism for reversing and for gear-ratio-changing, and is adapted for operating a plurality of live elements in machines which require to be driven at varying speeds; for example, various machine tools, engine lathes, wood veneer lathes, and the like.

This application is a division of the copending application filed April 25, 1922, Serial No. 556,511, which matured into Patent Number 1,543,678.

Other objects of the invention will in part be obvious and will in part appear hereinafter.

The invention accordingly comprises the features of construction, combinations of elements and arrangement of parts, which will be exemplified in the construction hereinafter set forth, and the scope of the application of which will be indicated in the claims.

For a fuller understanding of the nature and objects of the invention reference should be had to the following detailed description taken in connection with the accompanying drawings, in which:

Fig. 3 is an enlarged sectional view showing the interior of the gear-box shown in Fig. 2, the view being taken on the section line 3—3 in Fig. 1;

Fig. 4 is a similar enlarged horizontal sectional view of the gear-box taken on the line 4—4 in Fig. 3;

Figs. 7 and 8 are further fragmentary views showing other details in the application illustrated in Fig. 6; while Figs. 9 and 10 show diagrammatically the arrangements of the trains of gears disposed on opposite sides of a gear-box made in accordance with the invention.

Figure 1:
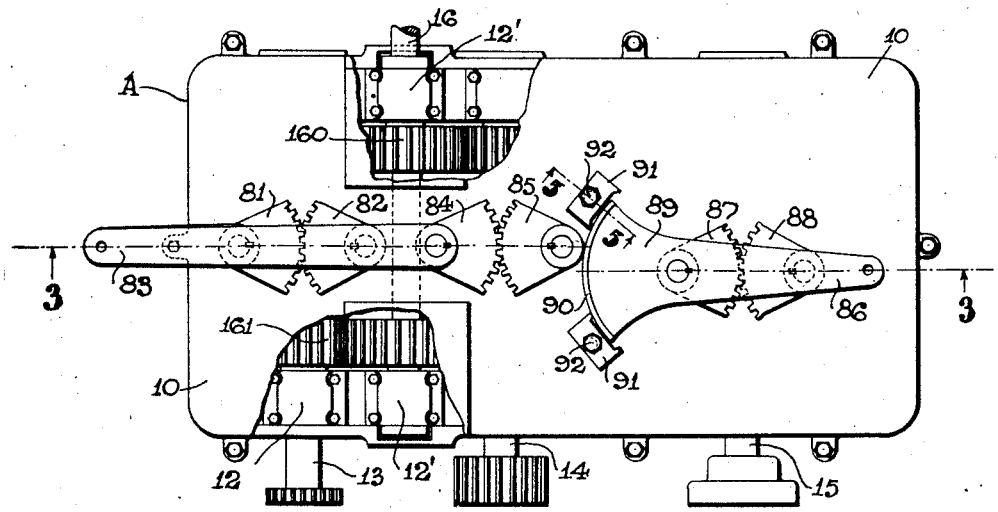
Fig. 1 is a top plan view of a power transmission unit or gear-box constructed in accordance with the invention, parts being broken away in order better to show certain details of construction.
Figure 2:
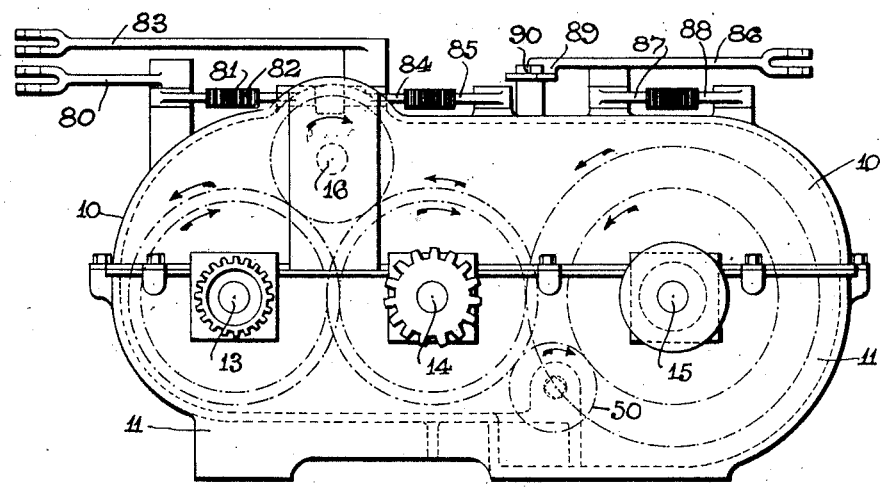
Fig. 2 is a side elevation of the unit shown in Fig. 1, the arrangement of the interior gearing being illustrated by means of dotted lines.
Figure 5:
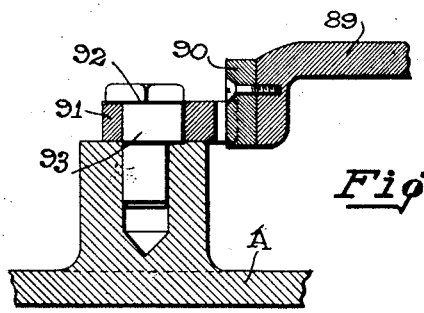
Fig. 5 is an enlarged fragmentary section taken on the line 5—5 of Fig. 1.

Referring now to the drawing, and more particularly to Figs. 1 to 3, A denotes generally the casing of a power transmission unit constructed to embody the invention, and comprises upper and lower sections shown at 10 and 11 respectively. These sections have complementary engaging sides, which are secured together in any convenient manner, for example, by means of screw bolts, as shown. Driving shafts 13, 14 and 15 are journaled transversely in the casing by means of bearings which are indicated at 12 and supported by the sides of the lower section. These shafts extend beyond the casing at one side thereof and are adapted to be operatively connected to drive the live or operative elements of a machine to be operated. A main power-driven shaft for transmitting driving power to the shafts 13, 14 and 15 is shown at 16 and is positioned in a higher plane than the other shafts, but is arranged parallel to them and supported in bearings 12' carried by pedestals or other suitable supports secured in, or supported from, the lower section of the casing. A driving motor (not shown in the interests of clearness) is connected in any convenient manner to the projected end of the main shaft 16. Within the casing the shaft 16 carrier spaced gears 160 and 161 keyed or otherwise rigidly secured thereto; these gears form the driving elements of the trains of gears hereinafter described as arranged on opposite sides of the casing.

Mounted on the shaft 13 within the casing at opposite ends are gears 17 and 18, which are arranged to rotate freely and independently of the shaft; these gears are here termed "clutch gears," and have the interiors of their rims formed with female conical clutch seats 19 and 20 which face each other, the gear teeth being formed on the external surfaces of the rims, as clearly shown in the drawings. In order that the gears 17 and 18 may rotate freely, they are provided with bearing-hubs, indicated respectively at 21 and 22, which are supported in an anti-friction manner on the bushings 23, the latter being interposed between the hubs and the shaft 13. Intermediate its ends, the shaft 13 is provided with a rigidly-attached cylindrical enlargement, indicated at 24, which serves as an abutment for the opposing ends of the bearing-hubs 21 and 22 and the bushings 23. The external diameter of the enlargement 24 is approximately the same as that of the adjacent end-portions of the hubs, so that together these elements provide a continuous cylindrical bearing surface adapted to support the clutch-sleeve 25 and permit it to have axial movement. In order to accomplish the axial movement of the sleeve 25 it is provided with an internal bore, whose diameter is a sliding fit over that of the enlargement 24 and slidingly keyed thereto by means of a key 27 seated in the enlargement 24 and working in a groove 26 formed in the interior surface of the sleeve itself. The ends of the sleeve 25 are provided respectively with male clutch members 28 and 29, having conical surfaces adapted for frictional engagement with the female clutch members 19 and 20. The clutch-sleeve 25 is also provided with an annular member or collar 30, which is adapted to turn freely in a circumferential groove which girdles the sleeve 25 intermediate its ends. The collar 30 is for convenience made in two parts, and secured together as indicated in Fig. 3, the collar being also provided with lugs 31 arranged to engage with longitudinal grooves milled respectively in depending stems 32 and 33, which are journaled in the top section of the casing A and arranged to turn so as to shift the collar 30 and move the sleeve 25. This arrangement provides selective means whereby the sleeve 25 may be made frictionally to engage or disengage with either of the clutch gears 17 or 18 or be moved to an intermediate position so that the clutch gears are permitted to run both at once as idlers upon the shaft 13. Similarly mounted on the shaft 14 are a pair of clutch gears 34 and 35, which have clutch sleeves, member and hubs of the same character as do the gears 17 and 18 described above, similar parts being indicated by the same reference numerals. The collar for shifting the clutch sleeve on shaft 14 is arranged to be actuated by means of another pair of depending stems designated 36 and 37, the gears 34 and 35 being accordingly adapted to be engaged alternately by their sleeve 25 or to run both at once as idlers upon their shaft.

The shaft 15 is preferably arranged to turn at different speeds and transmit the main power for driving the machine being operated. The shaft 15 is accordingly provided with a pair of clutch gears designated 38 and 39, which, as indicated in the drawings, are also provided with clutch mechanisms similar to those for the gears on shafts 13 and 14, the similar parts being designated as before by similar reference numerals. In the case of the gear 38, however, it is provided with a separate female clutch member 40. The clutch member 40 has a hub 41 to which the gear 38 is secured by means of the key 42, the hub 41 being mounted to turn in an anti-friction manner on the shaft 15 by means of the inserted bushing 43. Here the sliding clutch-sleeve is shown as provided with heads 45 and 46, which engage respectively with the female clutch member 40 and the female clutch formation on the inside of the gear 39. Stems for actuating the clutch mechanism on shaft 15 are shown at 48 and 49 which engage with the lugs on the collar 30 turning on the clutch-sleeve; these stems being arranged to shift the latter so as to engage alternately with clutch gears 38 and 39 and thereby drive shaft 15, or to occupy an intermediate position and permit the gears both at once to run as idlers.

There is also shown in Figs. 3 and 4 an idler pinion 50 journaled interiorly of the casing A on suitable supports in the lower section. This pinion is arranged to mesh with both of the gears 34 and 38, which are formed of such diameters that when mounted on their respective shafts they do not extend into meshing engagement. The gears 160, 17, 34, 50 and 38, in consequence, constitute the gear train at one side of the casing for the transmission power in the unit.

As shown in Fig. 4, and diagrammatically in Fig. 2, the driving gear 161 and the gears 18, 35 and 39, which are respectively positioned on the other ends of shafts 13, 14 and 15, constitute the gear train on the other side of the casing. In this train the driving gear 161 meshes directly with the gear 18, the gear 18 with the gear 35, and the latter with the gear 39. It will be understood, therefore, that the gears are relatively proportioned to drive their respective shafts at speeds suitable for the driving operations of the various live elements in the machine being operated; for example, for driving the turning spindle, the chucking, and the feed mechanism of a wood veneer lathe.

Figure 6:
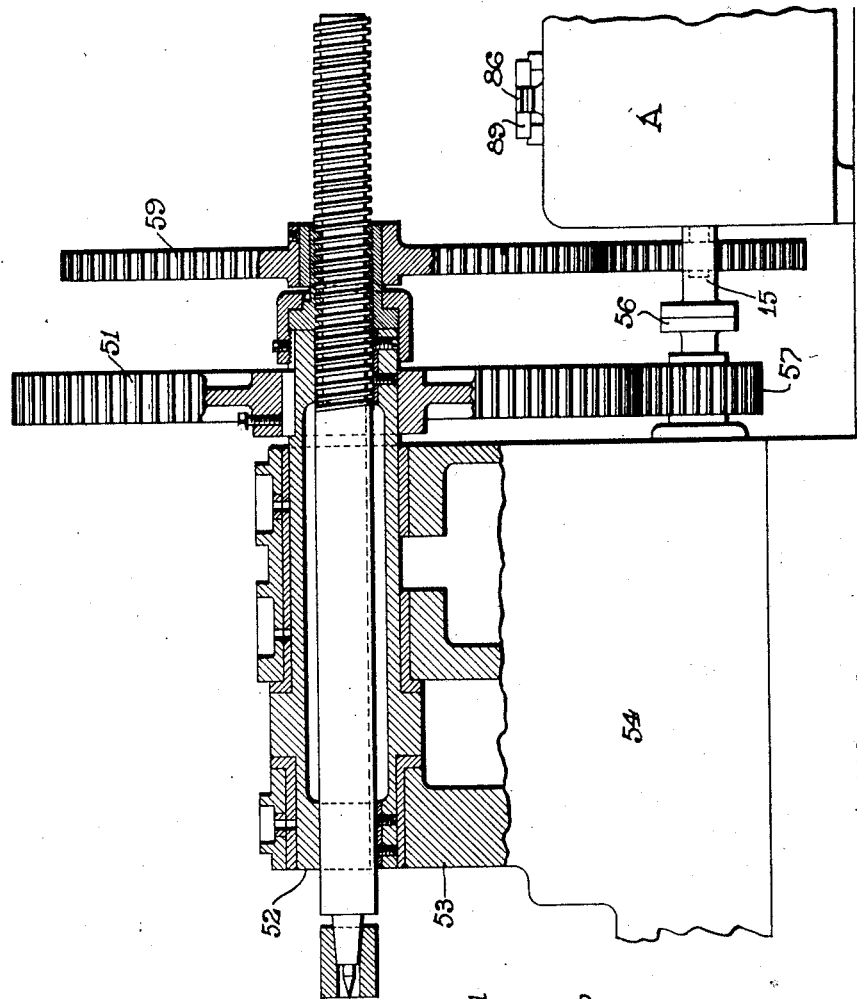
Fig. 6 is an elevation, parts being shown in section, of a machine tool showing the application thereto of the power transmission unit of this invention.
Figure 7:
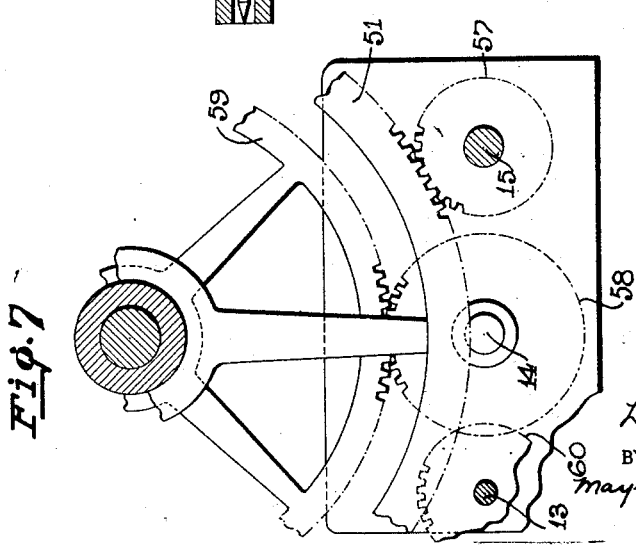

The power-transmitting unit of this invention is illustrated in Figs. 6, 7 and 8, by way of example, as applied for driving a wood-veneer lathe. Here 51 denotes the main gear for driving the spindle 52 journaled in the lathe head 53 on the bed 54. The power-transmission unit, designated A, is shown at the right and has its shaft 15 provided with a mechanical coupling 56 for driving the pinion 57 which meshes with the gear 51. The shaft 14 is likewise shown as provided with a pinion 58 engaging with the gear 59 arranged to drive the chucking mechanism, while the shaft 13 is shown as provided with a pinion 60 (see Fig. 8) meshing with the gear 61 of the feed drive train, which is generally designated 62. The details of the lathe-drive gearing and their connection are clearly set forth in the parent application, Serial No. 556,511, above referred to, of which this is a division.

It will now be obvious that when the main driving shaft 16 is turning in the direction indicated by the arrow at 71 in Fig. 9 the power-driven gear 160 which meshes with gear 34 will drive the gears 34, 17 and 38 respectively in the directions indicated by the arrows 72, 73 and 74. At the same time the power-driven gear 161 which meshes with gear 18 will drive gears 18, 35 and 39 respectively in the directions indicated by the arrows 75, 76 and 77. It will accordingly be seen that the gears 17 and 18 rotate in relatively opposite directions for the quick forward and backward driving of shaft 13, and also drive the gears 34 and 35, which actuate the chucking mechanism, in relatively opposite directions; the gears 38 and 39 on the main spindle-driven shaft 15, owing to the interposition of pinion 50, rotate in the same direction but at different speeds. In the arrangement shown there is a slight difference in the forward and reverse speeds of the gears 17 and 18, and also in the forward and reverse speeds of the gears 34 and 35, but this inequality will not be great, as the difference in their diameters is relatively small. By the selective arrangement of the clutches here described, it will be seen, moreover, that the shafts 13 and 14 may each be rotated in two opposite directions, while the shaft 15 is rotated continuously in the same direction but at different speeds.

Means for actuating the clutches and causing the clutch-sleeves to engage with their respective gears is shown in Figs. 1 to 3. The depending clutch operating stems 32, 33, 36, 37, 48 and 49 as above noted are rotatively mounted in pairs in the upper section of the casing and have their upper extremities extending through to the exterior of the casing. The stem 32 has secured to its external extremity an operating lever 80 having a rigidly-connected toothed segment 81, which meshes with a similar segment 82 on the external extremity of stem 33, the two segments by this arrangement are adapted to operate in unison but turn in opposite directions so as to impart the axial thrust to the clutch-sleeve 25 which moves it into engagement at will with either the gear 17 or 18.

The stems 36 and 37 are similarly provided with operating means comprising the relatively long lever 83 and the meshing segments 84 and 85 which are secured respectively to the upper extremities of the stems 36 and 37; suitable operating connections (not shown in the interests of clearness) are arranged to actuate the levers 80 and 88 in unison.

An operating lever is shown at 86 for actuating the clutch for the driving shaft 15. This lever is shown in Fig. 3 as mounted on the external extremity of the stem 48, to which is also attached the segment 87, the latter being arranged to engage with the segment 88 on the stem 49. In order to hold the operating lever 86 in any given position to which the operator may move it, a locking mechanism is provided. This mechanism preferably comprises the segmental extension 89 (shown as integral with the lever 86 and extending in a direction opposite to that of the main lever arm), the extension being provided with a depending edge or rim formed concentrically with the pivotal mounting of the lever arm and provided with a contact-plate 90, together with a coacting pair of blocks 91, which are secured on the top of the casing adjacent the plate 90 by pins 92. The pins 92 have eccentric portions 93 engaging with corresponding circular openings in the blocks. These blocks are adapted to be moved into and out of contact with plate 90 and thereby become permanently adjusted in any desired position in order to hold securely the lever 86 in any position to which the operator may have thrown it.

The operation of the power transmission unit as applied to the driving of a wood veneer lathe is as follows:

The motor connected to shaft 16 is first set into operation; the levers 80, 83 and 86 having been first moved to their neutral positions. The motor, when started, sets both trains of gears in motion through shaft 16, the gears turning, as indicated, in Figs. 9 and 10, respectively. When it is desired to start the lathe to turning, the lever 86 is pushed either forward or back from the neutral position shown in Figs. 2 and 3, or to the right or left from the position shown in Fig. 6. If the lever is pushed to the right in Fig. 6, (or back from the position in Figs. 2 and 3), the clutch sleeve is shifted to engage with the clutch member of gear 38, and shaft 15 partakes of the motion of the gear 38 and is driven in the direction of the arrow at 74, which is the same direction as the arrow at 77 in Fig. 10. Should the lever 86 be pushed in the opposite direction so that the clutch sleeve engages with the gear 39, then the shaft 15 partakes of the motion of the gear 39 and turns in the direction of arrow 77, but at a slower speed than when driven from gear 38.

The levers 80 and 83, as above indicated, are moved in unison, and when moved forward or back from the neutral position indicated in Figs. 2 and 3, they slide the clutch sleeves on the shafts 13 and 14 simultaneously in the same axial direction, so that they engage either with the gears 17 and 34, or with the gears 18 and 35. If moved back from the position shown in Fig. 2, the gears 17 and 34 are made to drive the shafts 13 and 14, respectively, in the direction shown by the arrows 73 and 72; the shafts 13 and 14 driving the feed and chucking mechanisms, respectively, of the veneer lathe. Should these levers, on the other hand, be moved through the neutral position to the forward position, then the clutch-sleeves are moved into engagement with the gears 18 and 35; the shafts 13 and 14, in consequence, rotate respectively in their opposite directions. It is thus seen that by moving the levers 80 and 83 the shafts 13 and 14 may be quickly reversed. As the two sets of levers are entirely independent the motions of the shafts 13 and 14 and that of the shaft 15 may be regulated entirely independently, the speed of the latter being changed at will or stopped altogether, while that of the shafts 13 and 14 may be continued or reversed at any stage of the operation.

It will be understood that the casing A has tight joints, so that it may be wholly or partly filled with oils in order to provide an oil-bath, which lubricates not only the bearings and the gears, thereby prolonging their life, but also reduces noise to a minimum, by the use of this invention, speed changes for the driving shafts 13, 14 and 15 may be quickly effected, with substantially a minimum of inconvenience; while belts and other troublesome parts are eliminated. Also, one may replace with a single piece of unitary mechanism the separate driving connections to the various live elements of a machine tool, such as belts, separate motors and the like heretofore generally employed, thus simplifying the construction needed, and greatly lessening the number of moving parts. The arrangement is likewise compact and occupies less space than the old devices having a corresponding range of speed-changes, while there is much less waste of power, thereby economizing in the maintenance and in the cost of production.

Since certain changes may be made in the above construction, and different embodiments of the invention could be made, without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent, is:

1. A power transmission, including a driveshaft, a pair of gears of equal size fixedly secured to said shafts, driven shafts, a pair of gears of different sizes rotatably mounted upon each of said latter shafts and in substantially the same plane with the respective gears of said driveshaft, one of the gears upon each of said driven shafts meshing with one of the gears of said driveshaft and with the gear of different size on the other driven shaft, and means for clutching said driven shafts with the gears mounted thereon.

2. A power transmission unit, including a driveshaft and a pair of driven shafts arranged parallel thereto, a pair of gears of equal size fixedly secured to said driveshaft, a pair of meshed gears of different sizes, the larger of which also meshes with one of said first-named gears, and both of which are in substantially the same plane therewith, said latter gears being loosely mounted one upon each of said driven shafts, a second pair of gears of different sizes also loosely mounted upon said driven shafts and in substantially the same plane with the second of the gears of the drive shaft, the larger of said latter gears being also in mesh with the driveshaft gear and with the smaller gear on the other driven shaft, and means for coupling said driven shafts with the gears mounted thereon.

3. A power transmission unit, including a pair of driven shafts to be optionally rotated in either direction, a driveshaft to be rotated solely in one direction, gears of equal size mounted upon said driveshaft, gears rotatably mounted one upon each of said driven shafts and each meshing with one of the gears of said driveshaft, a further pair of gears rotatably mounted one upon each of said driven shafts and being in mesh with the first-named driven gears and clearing the drive gears, and means for selectively coupling said driven shafts with the gears mounted thereon.

4. A transmission unit, including a driveshaft to be rotated in a single direction, a plurality of driven shafts, two of said latter shafts being adapted to be optionally rotated in either direction, a third of said driven shafts rotating in a single direction, gears fixedly secured to said driveshaft, gears loosely mounted upon said first two driven shafts, one of said gears upon each of said latter shafts being coupled with one of the gears upon said driveshaft, a gear carried by said third shaft and meshing with a gear of one of said driven shafts, a second gear mounted upon said third shaft, a gear interposed between said latter gear and the second gear of one of the driven shafts, and means for selectively coupling said first two driven shafts with the gears mounted thereon.

In testimony whereof I affix my signature.

LOUIS G. MERRITT.